United States Patent
Chae et al.

(10) Patent No.: US 11,580,406 B2
(45) Date of Patent: Feb. 14, 2023

(54) WEIGHT INITIALIZATION METHOD AND APPARATUS FOR STABLE LEARNING OF DEEP LEARNING MODEL USING ACTIVATION FUNCTION

(71) Applicant: Markany Inc., Seoul (KR)

(72) Inventors: Seung Yeob Chae, Seoul (KR); So Won Kim, Seoul (KR); Min Soo Park, Uiwang-si (KR)

(73) Assignee: Markany Inc., Seoul (KR)

( * ) Notice: Subject to any disclaimer, the term of this patent is extended or adjusted under 35 U.S.C. 154(b) by 527 days.

(21) Appl. No.: 16/729,506

(22) Filed: Dec. 30, 2019

(65) Prior Publication Data

US 2021/0201153 A1 Jul. 1, 2021

(30) Foreign Application Priority Data

Dec. 26, 2019 (KR) .................. 10-2019-0174988

(51) Int. Cl.
*G06N 3/08* (2006.01)
*G06N 3/084* (2023.01)
*G06N 3/04* (2023.01)

(52) U.S. Cl.
CPC .......... *G06N 3/084* (2013.01); *G06N 3/0472* (2013.01)

(58) Field of Classification Search
CPC .. G06N 3/0445; G06N 3/0454; G06N 3/0472; G06N 3/0481; G06N 3/084
See application file for complete search history.

(56) References Cited

U.S. PATENT DOCUMENTS

2018/0137413 A1* 5/2018 Li .................... G06N 3/0481
2019/0097912 A1* 3/2019 Salam .................. G06N 3/08

OTHER PUBLICATIONS

Glorot et al., "Understanding the difficulty of training deep feedforward neural networks", 2010, Proceedings of the 13th International Conference on Artificial Intelligence and Statistics (AISTATS) 2010, pp. 249-256. (Year: 2010).*

* cited by examiner

*Primary Examiner* — Brent Johnston Hoover
(74) *Attorney, Agent, or Firm* — Invenstone Patent, LLC

(57) ABSTRACT

Provided is an artificial neural network learning apparatus for deep learning. The apparatus includes an input unit configured to acquire an input data or a training data, a memory configured to store the input data, the training data, and a deep learning artificial neural network model, and a processor configured to perform computation based on the artificial neural network model, in which the processor sets the initial weight depending on the number of nodes belonging to a first layer and the number of nodes belonging to a second layer of the artificial neural network model, and determines the initial weight by compensation by multiplying a standard deviation ($\sigma$) by a square root of a reciprocal of a probability of a normal probability distribution for a remaining section except for a section in which an output value of the activation function converges to a specific value.

7 Claims, 11 Drawing Sheets

WEIGHT INITIALIZATION METHOD AND APPARATUS FOR STABLE LEARNING OF DEEP LEARNING MODEL USING ACTIVATION FUNCTION

CROSS-REFERENCE TO RELATED APPLICATIONS

This application claims the benefit of priority of Korean Patent Application No. 10-2019-0174988 filed on Dec. 26, 2019, all of which are incorporated by reference in their entirety herein.

BACKGROUND OF THE INVENTION

Field of the Invention

The present invention relates to a deep learning model and, more particularly, to a method for stable learning of a deep learning model.

Related Art

Recently, artificial intelligence has been recently drawing attentions in many fields including image recognition. In particular, since overfitting has been solved and hardware has been developed and big data can be achieved, a deep learning algorithm enabled to train itself based on a huge amount of data and find out a pattern is drawing attention and a lot of researches on the deep learning algorithm is ongoing.

Deep learning is a procedure of training an artificial neural network to be optimized, and the artificial neural network is based on the principle of how a neuron in human brain works. When a neuron sends a signal to a next neuron after receiving an input signal and establishing connection, intensity of the signal may become so weak that the signal is not sent to the next neuron or the signal may be sent with strong intensity not as desired. Such intensity is determined as multiplication of a weight of an input value and a sum of deviations of input values pass through an activation function That is, the activation function has a critical role when it comes to determining strength of connection between neurons. However, researches on the activation function have yet solved many problems, for example, a problem that back propagation learning using a derivative is not possible, Vanishing Gradient problem that accumulated derivate multiplications are converged to 0 and thus learning is not possible, and a problem that back propagation learning is not possible in a negative number region. Thus, there is a need for an activation function that can solve these problems.

In addition, as described above, the activation function that determines the strength of connection between neurons constituting the artificial neural network and greatly influences learning performance has a significant effect on the learning the performance according to setting of an initial weight. An initialization method studied so far have many problems, for example, a problem that weights of all neurons is updated to the same value in the learning procedure, and thus a plurality of channel gain of each layer cannot be obtained, a problem that the results of biasing to 0 or 1 are obtained, and a problem that the output value converge to 0. Thus, there is a problem that the stable learning is hard to achieve.

SUMMARY OF THE INVENTION

The present invention provides a deep learning artificial neural network learning apparatus capable of stably learning a deep neural network that uses a first activation function in a positive number region and a second activation function in a negative number region, and uses an ReELU activation function including linear functions of different gradients by dividing an interval of the second activation function and improving performance of the deep neural network.

In an aspect, an artificial neural network learning apparatus for deep learning includes an input unit configured to acquire an input data or a training data, a memory configured to store the input data, the training data, and a deep learning artificial neural network model, and a processor configured to perform computation based on the artificial neural network model, in which the processor may set an initial weight affecting an activation function between a first node and a second node subsequent to the first node of the artificial neural network model, the first node being included in a first layer and the second node being included in a second layer, set the initial weight depending on the number of nodes belonging to the first layer and the number of nodes belonging to the second layer of the artificial neural network model, and determine the initial weight by compensation by multiplying a standard deviation (a) by a square root of a reciprocal of a probability of a normal probability distribution for a remaining section except for a section in which an output value of the activation function converges to a specific value.

The initial weight may be using a normal probability distribution in which an average is 0 and the standard deviation (σ) is $$\sigma = \sqrt{\frac{2}{n_{inputs} + n_{outputs}}} \cdot \sqrt{\frac{1}{P(mK < x)}},$$

(here, $n_{inputs}$ denotes the number of nodes belonging to the first layer, $n_{outputs}$ denotes the number of nodes belonging to the second layer, m denotes a length of a specific section in the activation function, and K denotes the number of sections having a constant length in the activation function).

The specific value may be −1, and a section converging to the specific value may be a section having a value smaller than a multiplication of the m value and the K value.

The processor may determine whether an input value to the first node of the artificial neural network is a positive value or a negative value, execute a first activation function corresponding to the input value of the positive value, execute a second activation function corresponding to the input value of the negative value, and execute the first activation function or the second activation function to provide a generated result value to the second node of the artificial neural network, the first activation function may be a rectified linear unit (ReLU) function, the second activation function may be a linear function that has a first gradient in a first section of a negative number region and a second gradient in a second section of the negative number region, and the first gradient and the second gradient may be different gradients.

The second activation function may be expressed by the following equation.

$$M(x) = \begin{cases} \frac{S'(A_n) - S'(A_{n+1})}{m}(x - A_n) + S'(A_n) & \begin{array}{l} \text{if } A_n > x > A_{n+1}(n = -0, 1, \ldots, K) \\ A_0 = 0 \\ A_{i+1} = A_i - m(i = 0, 1, \ldots, K-1) \\ A_{K+1} = -\infty \end{array} \\ -1 & \text{otherwise} \end{cases}$$

-continued $$S'(x) = \frac{2}{1+e^{-x}} - 1$$

Here, M(x) denotes the second activation function, $A_n$ denotes an x value of an end point of a specific section, n and i denote section indexes, m denotes a length of a section, and K denotes the number of sections having a predetermined length.

The m value denoting the length of the section may have a value of 2, and he K value denoting the number of sections may have a value of 2.

At least one of the m value and the K value may be determined in proportion to the number of nodes of the artificial neural network.

In another aspect, an artificial neural network learning method for deep learning includes acquiring an input data or a training data, and performing learning through a deep learning artificial neural network model based on the input data and the training data, in which the performing of the learning through the deep learning artificial neural network model may include setting an initial weight affecting an activation function between a first node and a second node subsequent to the first node of the artificial neural network model, the first node being included in a first layer and the second node being included in a second layer, the setting of the initial weight may include setting the initial weight depending on the number of nodes belonging to the first layer and the number of nodes belonging to the second layer of the artificial neural network model, and the initial weight may be determined by compensation by multiplying a standard deviation (a) by a square root of a reciprocal of a probability of a normal probability distribution for a remaining section except for a section in which an output value of the activation function converges to a specific value.

DESCRIPTION OF EXEMPLARY EMBODIMENTS

Figure 1:
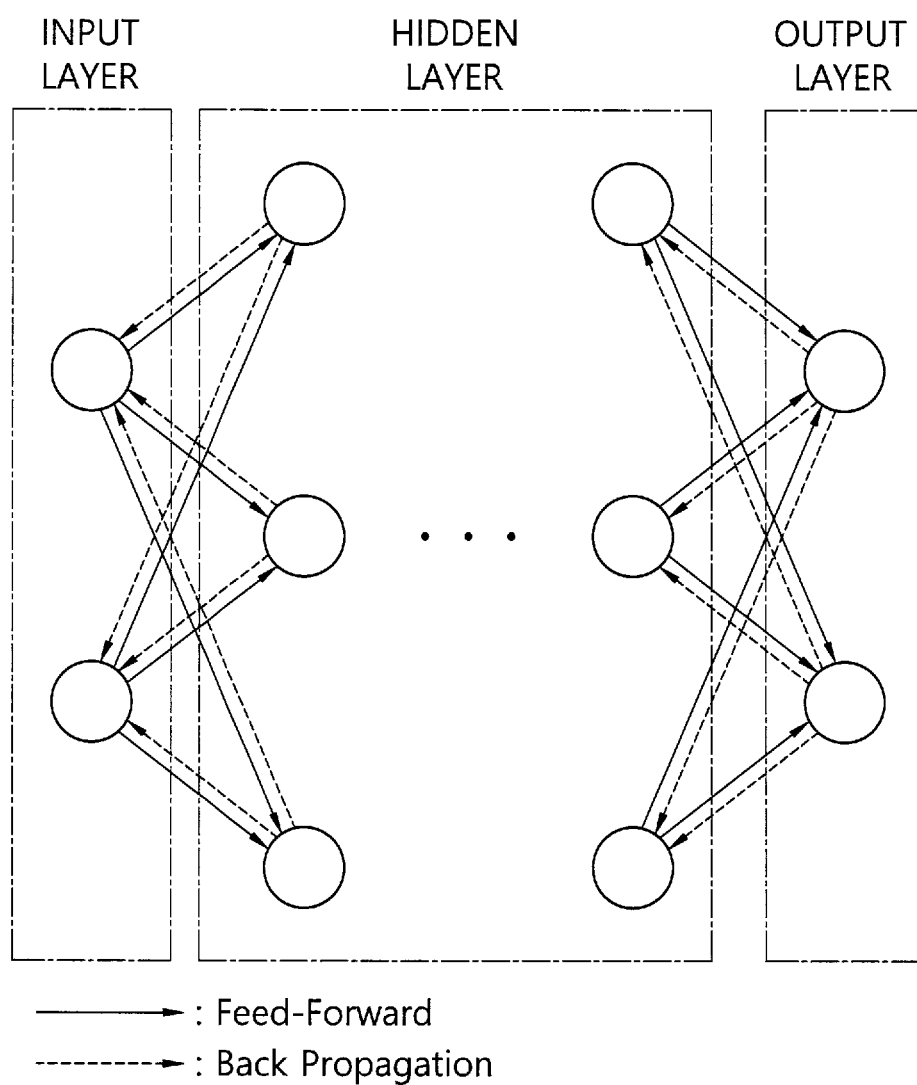
FIG. 1 is a conceptual diagram showing an artificial neural network in which an activation function is executed according to an embodiment of the present invention.

While the invention can be modified in various ways and take on various alternative forms, specific embodiments thereof are shown in the drawings and described in detail below as examples.

However, it should be understood that there is no intent to limit the invention to the particular forms disclosed, but on the contrary, the invention covers all modifications, equivalents, and alternatives falling within the spirit and scope of the present invention.

It will be understood that, although the terms "first," "second," etc. may be used herein to describe various elements, these elements should not be limited by these terms. These terms are only used to distinguish one element from another. For example, a first element could be called a second element, and a second element could similarly be called a first element without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements.

The terminology used herein to describe embodiments of the invention is not intended to limit the scope of the invention. Singular forms are intended to include plural forms unless the context clearly indicates otherwise. It will be further understood that the terms "comprise," "comprising," "include," and/or "including," when used herein, specify the presence of stated features, numbers, steps, operations, elements, components, and/or combinations thereof, but do not preclude the presence or addition of one or more other features, numbers, steps, operations, elements, components, and/or combinations thereof. Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

Hereinafter, exemplary embodiments of the invention will be described in detail with reference to the accompanying drawings. The same or corresponding elements will be consistently denoted by the same respective reference numerals and described in detail no more than once regardless of drawing symbols.

Artificial intelligence (AI) is a field of computer science and information technology that studies how to enable computers to do thinking, learning, self-development, and the like that human intelligence can do, and means that computers imitate human intelligent behavior.

In addition, the artificial intelligence does not exist by itself, but is directly and indirectly related to other fields of computer science. In particular, in modern times, many attempts have been actively made to introduce artificial intelligence elements into various fields of information technology and use the artificial intelligence elements to solve problems in those fields.

The artificial neural network is to model a working principle of biological neurons and the connection between neurons, and is an information processing system in which a plurality of neurons called nodes or processing elements are connected in the form of a layer structure.

The artificial neural network is a model used in machine learning and is a statistical learning algorithm inspired by a biological neural network (in particular, a brain of an animal's central nervous system) in machine learning and cognitive science.

Specifically, the artificial neural network may refer to an overall model having problem-solving ability by artificial neurons (nodes) that form a network by synapse coupling to change the coupling strength of synapses through learning.

The artificial neural network may include a plurality of layers, each of which may include a plurality of neurons. In addition, the artificial neural network may also include synapses connecting between neurons.

The artificial neural network may generally be defined an activation function of generating the following three factors: (1) a connection pattern between neurons in different layers, (2) a learning procedure of updating weights of the connection, and (3) an output value from a weighted sum of inputs received from the previous layer.

The artificial neural network may include network models such as deep neural network (DNN), recurrent neural network (RNN), bidirectional recurrent deep neural network (BRDNN), multilayer perceptron (MLP), and convolutional neural network (CNN), but is not limited thereto.

In the present specification, the term 'layer' may be used interchangeably with the term 'layer'.

The artificial neural networks are divided into single-layer neural networks and multilayer neural networks depending on the number of layers.

A typical single layer neural network includes an input layer and an output layer. This is described in more detail with reference to FIG. 1 below.

FIG. 1 is a conceptual diagram showing an artificial neural network in which an activation function is executed according to an embodiment of the present invention.

Referring to FIG. 1, an artificial neural network in which an activation function is executed according to the present invention includes an input layer, a hidden layer, and an output layer. Basically, the hidden layer may be composed of a numerous number of nodes. The embodiment of FIG. 1 is about an example of a deep neural network which is the typical artificial neural network structure, but aspects of the present invention is not necessarily limited to the example of the deep neural network.

Here, the input layer is a layer that accepts external data, and the number of neurons in the input layer is equal to the number of input variables, and the hidden layer is located between the input layer and the output layer to receive a signal from the input layer to extract characteristics and transfer the extracted characteristics to the output layer. The output layer receives the signal from the hidden layer and outputs an output value based on the received signal. The input signals between neurons are multiplied by their respective strength of connections (weights), and if the sum is greater than a neuron's threshold, the neuron is activated and outputs the output value obtained through the activation function.

As a method for training a deep neural network, feedforward marked with a solid line and back propagation marked with a dotted line may be used. In the feed forward, learning is performed in order of the input layer, the hidden layer, and the output layer. A node value of each layer may be a value corresponding to an activation function, the value which is obtained by adding up multiplication of all weights connected to a node value of a previous layer. Then, the activation may be differentiated in order of the output layer, the hidden layer, and the input layer so as to perform back propagation of an error, thereby optimizing a weight. The activation function is directly involved in the feedforward and back propagation procedures, thereby greatly influencing learning speed and performance.

Meanwhile, the deep neural network including the plurality of hidden layers between the input layer and the output layer may be a representative artificial neural network implementing deep learning, which is a kind of machine learning technology.

The artificial neural network can be trained using training data. Here, the learning may mean a procedure of determining parameters of an artificial neural network using learning data in order to achieve the purpose of classifying, regressing, clustering, or the like input data. Representative examples of the parameters of the neural network may include weights applied to synapses and biases applied to neurons. This is described in more detail with reference to FIG. 2 below.

Figure 2:
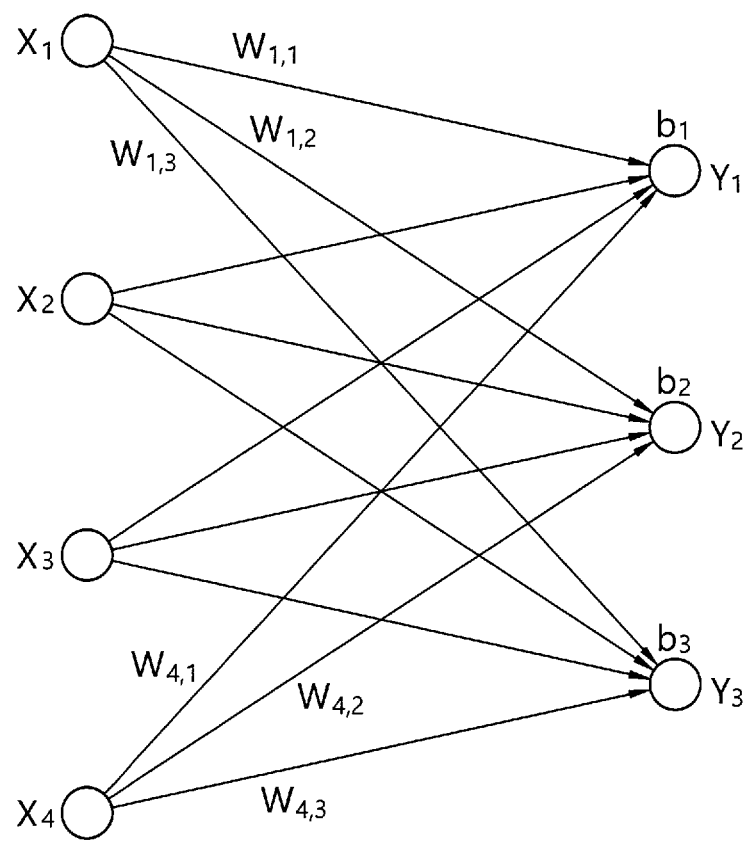
FIG. 2 is a conceptual diagram for explaining a weight and a bias value applied to a node of a second layer from a node of a first layer.

FIG. 2 is a conceptual diagram for explaining a weight and a bias value applied to a node of a second layer from a node of a first layer.

Referring to FIG. 2, four nodes of the first layer are connected to three nodes of the second layer. In this case, a first node $x_1$ of the first layer is multiplied by a weight $w_{1,1}$, and is added to a bias $b_1$, thereby calculating a value of a first node $y_1$ of the second layer. As such, the four input nodes transfer data to the three output nodes through multiplication and addition operations of the weight and bias. In this case, the learning stability is determined by how the initial value of the weight is set. That is, as the neural network becomes deeper, the distribution of the weights of each neural network may be biased to one side or may be severely gathered into a specific value part. When this phenomenon occurs, gradient vanishing may occur, and the expressiveness of the neural network is limited, and the meaning of deeply constructing the neural network vanishes. Therefore, it is necessary to initialize the weight properly before learning.

On the other hand, the artificial neural network has a structure specified by a model configuration, an activation function, a loss function or a cost function, learning algorithm, optimization algorithm, and the like, and hyperparameters may be set in advance before training, and then model parameters may be set through the training to specify content.

In particular, elements that determine the structure of the artificial neural network may include the number of hidden layers, the number of hidden nodes included in each hidden layer, an input feature vector, a target feature vector, and the like.

The hyperparameters contain several parameters that need to be initially set for training, such as initial values of the model parameters. The model parameters contain several parameters to be determined through training. For example, the hyperparameters may include inter-node initial weights, inter-node initial bias values, a mini-batch size, the number of learning repetitions, a learning rate, and the like. The model parameters may include inter-node weights, inter-node bias, and the like.

Figure 3A:
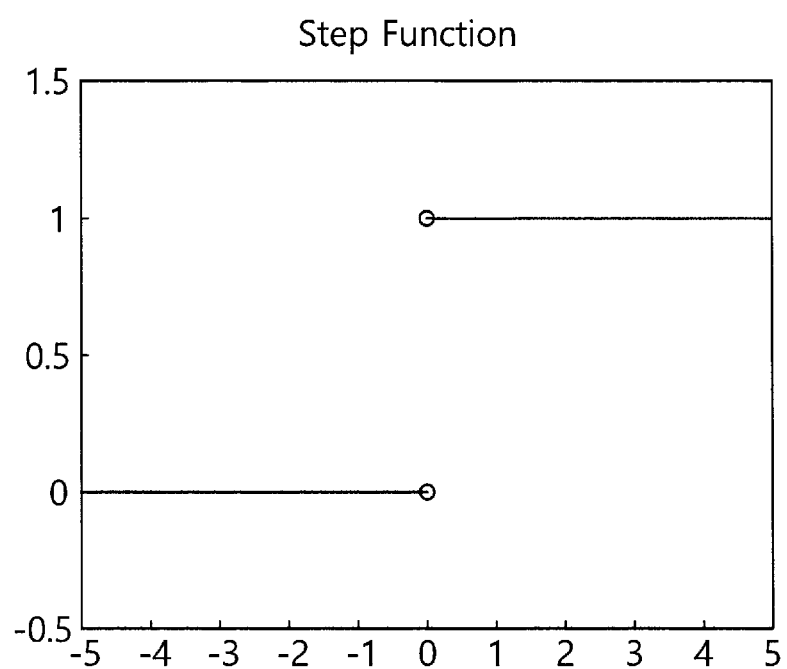
FIG. 3A is a graph showing a step function.

FIG. 3A is a graph showing a step function.

Referring to FIG. 3A, a step function is the basic activation function which is expressed by the following equation.

$$f(x) = \begin{cases} 0, & \text{if } x \leq 0 \\ 1, & \text{if } x > 0 \end{cases} \qquad \text{[Equation 1]}$$

Activation or inactivation may be expressed by a function which has 1 in response to a positive input value, while having 0 in response to a negative input value. Here, a degree depending on the size of an input value cannot be expressed. In addition, back propagation learning using a derivative is not possible.

Figure 3B:
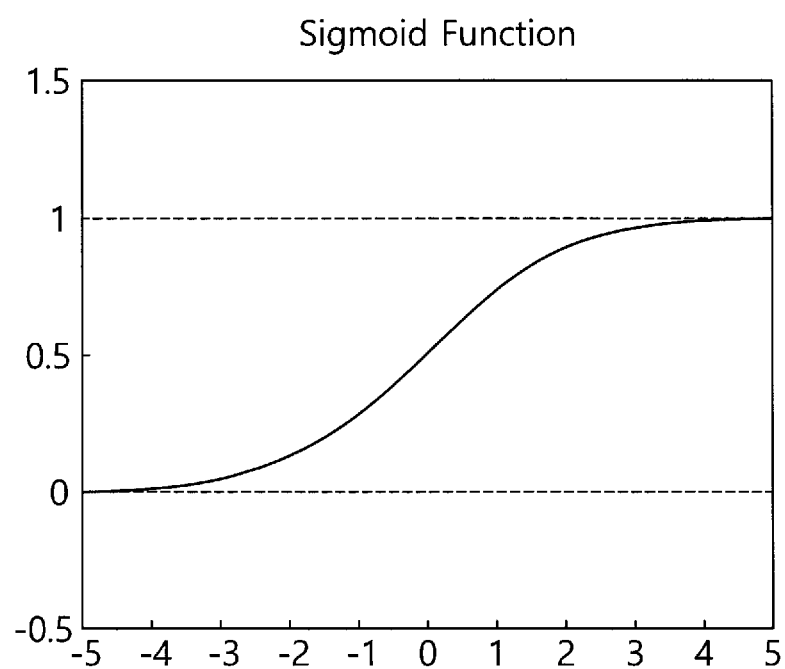
FIG. 3B is a graph showing a sigmoid function.

FIG. 3B is a graph showing a sigmoid function.

Referring to FIG. 3B, the sigmoid function is expressed by the following equation.

$$s(x) = \frac{1}{1 + e^{-x}} \qquad \text{[Equation 2]}$$

The sigmoid function is a non-linear function having a value between 0 and 1, and enables back propagation learning using a derivate. An activation function is differentiated in the back propagation learning, and the derivate of the sigmoid function is always smaller than 1. Accordingly, a derivate multiplication accumulated after passing through too many nodes in the hidden layer of the deep neural network eventually converges into 0, which may lead to the Vanishing Gradient problem that disenables learning. Thus, this function is not appropriate to use in a deep neural network having a large number of layers.

Figure 3C:
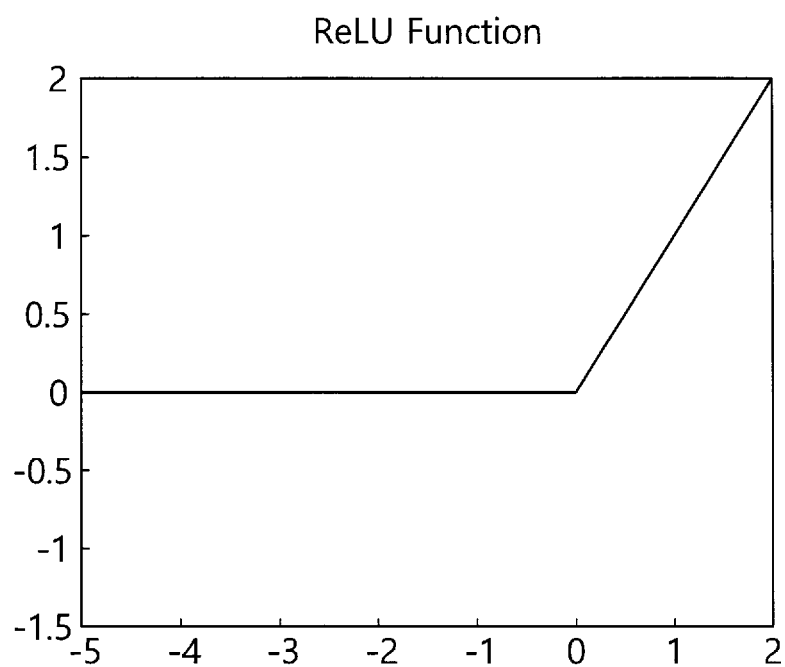
FIG. 3C is a graph showing a rectified linear unit (ReLU) function.

FIG. 3C is a graph showing a rectified linear unit (ReLU) function.

Referring to FIG. 3C, the ReLU function is expressed by the following equation.

$$f(x) = \begin{cases} x, & \text{if } x > 0 \\ 0, & \text{otherwise} \end{cases} \qquad \text{[Equation 3]}$$

The ReLU function is a function that solves the Vanishing Gradient problem of the sigmoid function shown in FIG. 2B.

The derivate of the ReLU function is either 1 or 0, and thus, the ReLU function may solve the Vanishing Gradient problem and the speed of differentiation thereof is 6 times faster compared to the sigmoid function.

However, if most of input values are negative, a derivate of the ReLU function is 0 and it may cause the dying ReLU problem where back propagation learning is not possible.

Figure 4:
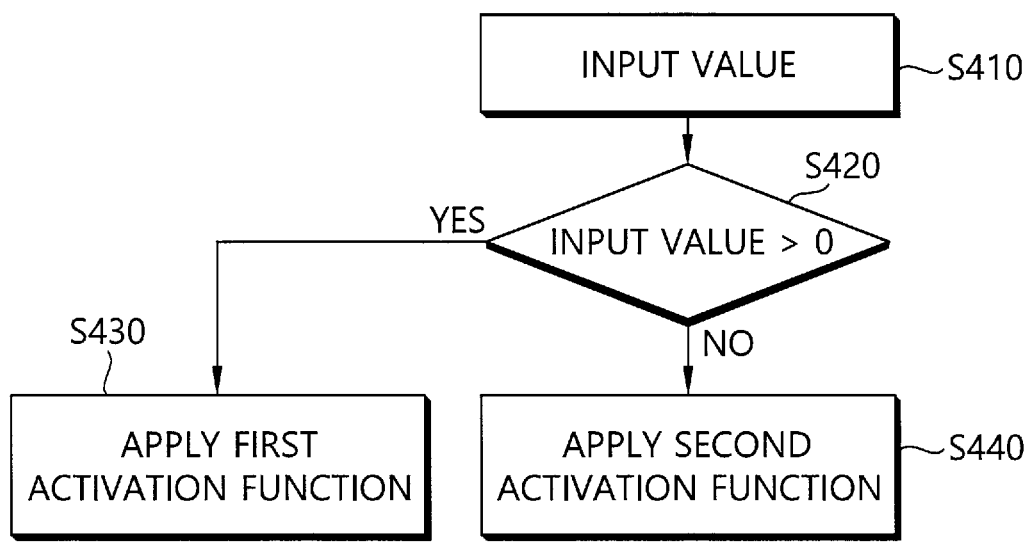
FIG. 4 is a flowchart schematically showing a method for executing an ReELU activation function according to an embodiment of the present invention.

FIG. 4 is a flowchart schematically showing a method for executing an ReELU activation function according to an embodiment of the present invention.

In order to solve both the Vanishing Gradient problem and the Dying ReLU problem shown in FIGS. 3A to 3C, an apparatus according to an embodiment of the present invention performs control to apply the ReLU function (the first activation function) function in a positive number region and a function (a second activation function) having a constant gradient in the entire section based on the sigmoid function in a negative number region. According to an embodiment of the present invention, the apparatus is a computing apparatus capable of performing deduction and/or computation and it may include a smart phone, a PC, a tablet PC, a desktop, etc. In the present specification, the above activation function may be referred to as a ReELU activation function.

Referring to FIG. 4, the apparatus receives an input value from a node of a specific layer (e.g., one of the input layer, the hidden layer, and the output layer) (S410). The apparatus determines if the input value is a positive value or a negative value (S420). If the input value is determined as a positive value, the apparatus applies the ReLU function which is the first activation function (S430). Accordingly, a graph of the first linear function of y=x may be applied. According to an embodiment of the present invention, the first activation function may follow the linear function of y=ax, where "a" can have a value of a real number.

If the input value is a negative value, the second activation function is applied (S440). As described above, the second activation function is a function to be applied only in response to a negative input value, it is a linear function having different gradients for respective sections. This will be described in more detail with reference to FIGS. 4 and 5.

Figure 5:
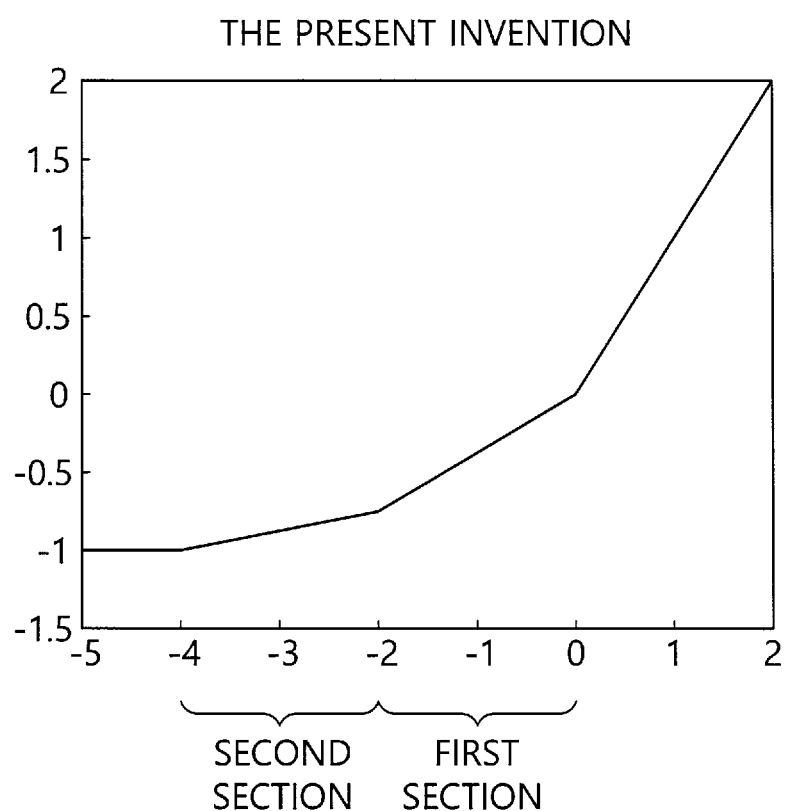
FIG. 5 is a graph showing the ReELU activation function according to the embodiment of the present invention.

FIG. 5 is a graph showing the ReELU activation function according to the embodiment of the present invention.

Referring to FIG. 5, an activation function according to an embodiment of the present invention follows the ReLU function in response to a positive input value, and a second activation function having different gradients based on the sigmoid function in response to a negative input value.

In the embodiment of FIG. 5, the second activation function is set to have a first section and a second section where a gradient in the first section is about 0.4 and a gradient in the second section is about 0.1. The second activation function may be expressed by the following equation.

$$M(x) = \begin{cases} \frac{S'(A_n) - S'(A_{n+1})}{m}(x - A_n) + S'(A_n) & \text{if } A_n > x > A_{n+1}(n = -0, 1, \ldots, K) \\ & A_0 = 0 \\ & A_{i+1} = A_i - m(i = 0, 1, \ldots, K-1) \\ & A_{K+1} = -\infty \\ -1 & \text{otherwise} \end{cases} \qquad \text{[Equation 4]}$$

$$S'(x) = \frac{2}{1 + e^{-x}} - 1$$

Here, M(x) denotes the second activation function, $A_n$ denotes an x value of an end point of a specific section, n and i denote section indexes, m denotes a length of a section, and K denotes the number of sections having a predetermined length.

That is, the ReELU activation function according to an embodiment of the present invention may vary in different forms depending on values of m and K, and the values may be adjusted according to a learning method in use. The values of m and K may be preset by a user as default values and may be changed arbitrarily by the user. However, if the value of m is too small, the activation function may become identical to the sigmoid function. If the value of K is too great, the Vanishing Gradient problem may happen. Therefore, various methods for setting those values may be considered as below.

According to the embodiment of the present invention, the threshold values for the m value and the K value may be preset so that the sections are not divided into the lengths equal to or less than the threshold and the sections are not divided into the number equal to or less than the threshold.

In particular, at least one value of m and K may be set to have a corresponding value proportional to the number of nodes in the input layer, the hidden layer, and the output layer. That is, in the case where there are too many nodes, when a section divided by setting m to a small value and K to a large value, there may be a problem that back propagation learning causes convergence into 0. In this case, it is preferable to set m to a relatively large value and K to a relatively small value. On the other hand, if there are few nodes, it is advantageous for learning to divide a section by setting m to a small value and/or setting k to a large value. The apparatus may determine that the number of nodes is small by setting a specific reference value.

According to another embodiment of the present invention, a constant value of m is applied to all sections and all the sections have the same length, but this is not necessary all the time. Sections may be set to have different lengths by setting a first section to have a length of 2 and setting a second section to have a length of 1. In this case, when it is assumed that an earlier section index comes in a negative number region closes to 0, it is preferable that a length of a section having an earlier index is longer than a length of a section having a subsequent index. Alternatively, the apparatus may consider the opposite case.

In the embodiment of FIG. 5, the apparatus sets such that a Y-axis value of the second activation function, that is, a result value, varies between 0 and −1, but aspects of the present invention are not necessarily limited thereto. According to another embodiment of the present invention, the result value may vary in a wide range, such as a range from 0 to −2 or a range from 0 to −3. That is, the apparatus may not necessarily operate only in a range of the scale two times the scale of the sigmoid function, and may operate in a range of the scale three, four, five, or more times the scale of the sigmoid function.

Figure 6:
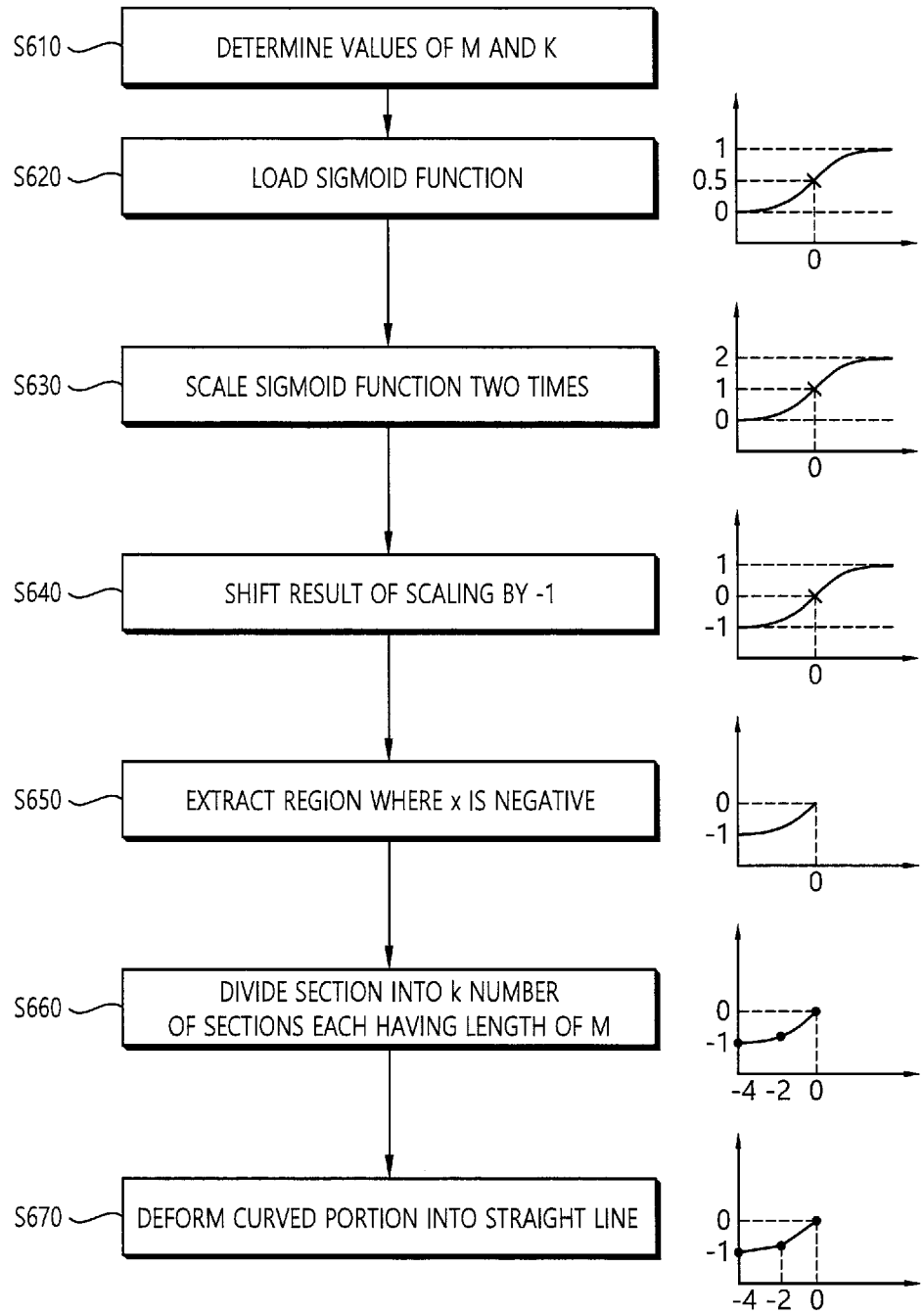
FIG. 6 is a flowchart showing a procedure of generating a second activation function executed in a negative number region of the ReELU activation function according to the embodiment of the present invention.

FIG. 6 is a flowchart showing a procedure of generating a second activation function executed in a negative number region of the ReELU activation function according to the embodiment of the present invention.

Referring to FIG. 6, the apparatus may generate a second activation function to be applied in a negative number region, by inferring the second activation function from the sigmoid function. First, the apparatus determines values for m and K (S610). The values form and K may be preset or may be determined in correspondence with the type of an artificial neural network to be trained and/or the number of nodes in the artificial neural network.

The apparatus loads the sigmoid function (S620). Then, the apparatus scales two times the sigmoid function (S630). At this time, the scaling coefficient is not necessarily 2 times. The scaling coefficient may be varied by a user's selection, a type of an artificial neural network, and/or the number of nodes.

After scaling the sigmoid function, the apparatus may shift a result value (a Y-axis value) by −1 so that a region of a result value corresponding to a value of x (Y-axis value) in a negative number region operates in a region from 0 to −1 (S640). Then, only a region where the value of x is negative is extracted (S650). This is because a positive number region operates as the first activation function (ReLU function), not the second activation function).

Then, based on m and K in the extracted varied sigmoid function, a section is divided into K number of sections having a length of m (S660). Then, an end value of each section has a result value of the varied sigmoid function.

Then, a curved portion in each section is deformed to a straight line to induce the second activation (S670). Since an end value of each section has a result value of a varied sigmoid function, the apparatus deforms a curved portion to a straight line by connecting end values a straight line. Then, the portion deformed to the straight line is set to have a predetermined gradient, so that a linear value having a different gradient in each section is provided.

Figure 7:
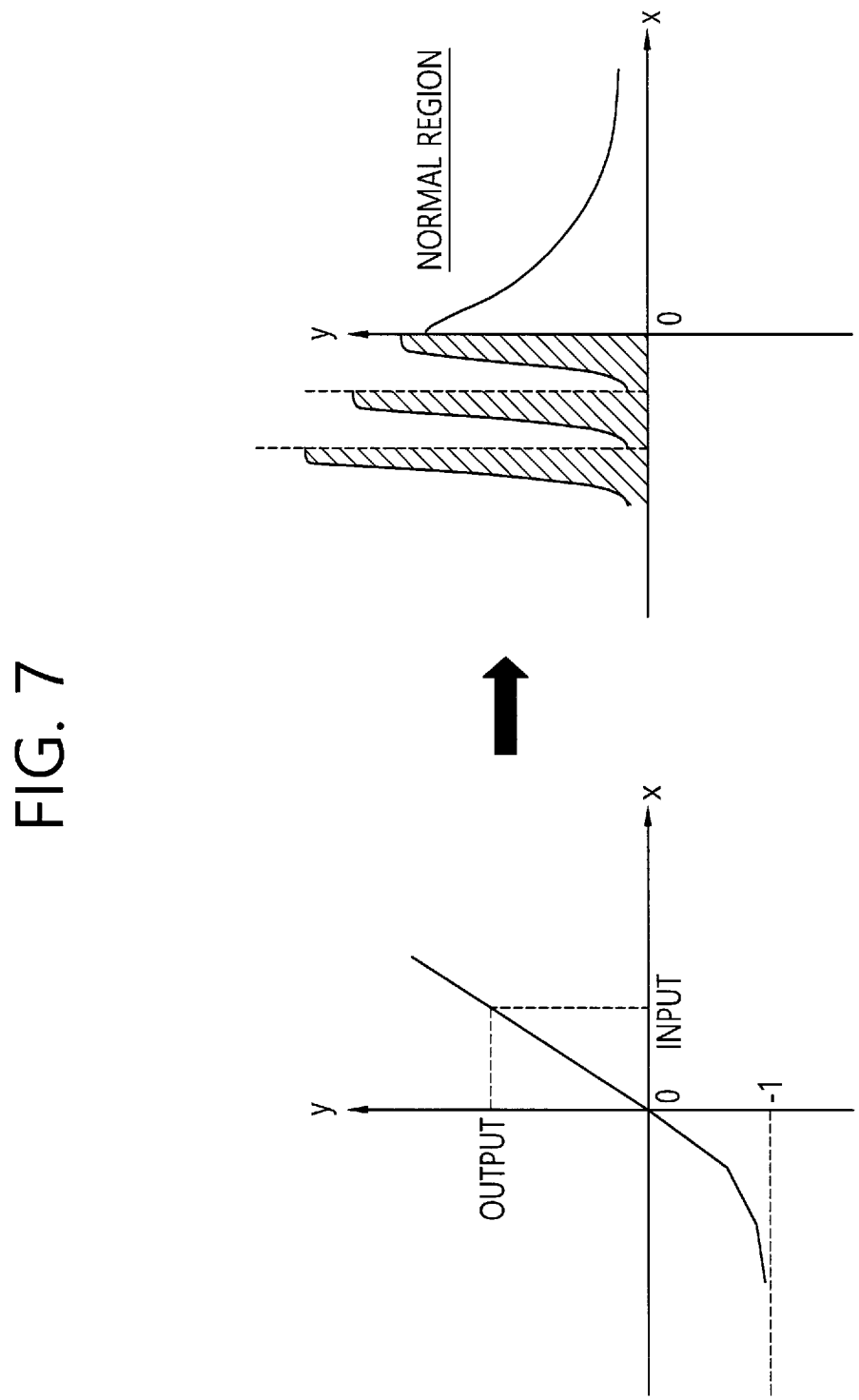
FIG. 7 is a conceptual diagram for explaining a problem when a general initialization method is applied to the ReELU activation function of FIG. 5.

FIG. 7 is a conceptual diagram for explaining a problem when a general initialization method is applied to the ReELU activation function of FIG. 5.

As described above, it is very important to set the initial value of the hyperparameter such as weight and bias of each layer of the neural network. The problem to be solved by the neural network is non-convex optimization, and therefore the optimal point may not be found depending on the starting point. If the initial value of the hyperparameter is set appropriately, the gradient adjustment also has a meaningful result. There are several ways to set the initial value.

First, there is a zero initialization method. This is a method for initializing all weights to 0. However, according to this initialization method, there is a problem in that a plurality of channel gains of each layer cannot be obtained because the weights of all neurons are updated to the same value in the learning procedure.

Next, there is a Gaussian distribution initialization method. This is the initialization method using a Gaussian distribution. According to this method, the standard deviation value needs to be determined according to the characteristics of the activation function. For example, in the case of using the sigmoid activation function, when a standard deviation of the Gaussian distribution is large, the standard deviation is biased to 0 or 1, and when the standard deviation is small and the layer is deep, the standard device converges to 0.5 (average value), so the learning does not progress appropriately. That is, since the appropriate standard deviation needs to be determined, and the standard deviation of the initial value needs to be found each time according to various variables, the efficiency is reduced.

Next, there is a Xavier Initialization method. This is dependent on the number of previous nodes and next nodes in each layer. This is expressed by the following equation.

$$W \sim N(0, \text{Var}(W)) \quad \quad [\text{Equation 5}]$$

$$\text{Var}(W) = \sqrt{\frac{2}{n_{in} + n_{out}}}$$

Here, $n_{in}$ denotes the number of dimensions of the previous layer (number of nodes), $n_{out}$ denotes the number of dimensions (the number of nodes) of the next layer, and W denotes the weights of each layer.

This initialization method is effective in the nonlinear activation function. However, in recent years, the value converges to 0 if there is a combination of linear functions, such as the ReLU function that is most commonly used in the artificial neural networks or various activation functions of the ReLU series, which is not suitable for learning.

Next, there is a He Initialization method. This may be expressed by the following initialization method that tries to solve the problem of converging to 0 as the layer becomes deeper.

$$W \sim \text{Uniform}(n_{in}, n_{out})$$

$$\text{Var}(W) = \frac{2}{n_{in}}$$

[Equation 6]

According to this, the standard deviation of the distribution of initial values is $\sqrt{2}$ times to be wider, and thus the convergence to 0 may be solved. This He initialization method is effective in ReLU, but is hard to be applied to all activation functions of ReLU series.

Referring to FIG. 7, it is preferable that the apparatus uses a weight initialization method suitable for the ReELU activation function according to the embodiment of the present invention. The ReELU activation function has the form as shown in the left graph of FIG. 7. If the Xavier initialization method is applied to the activation function of the form, the positive number region follows the normal probability distribution because the positive number region is the same as the ReLU function, but in the negative number region, the value of the activation function tends to diverge in the section close to zero except for the section where the value of the activation function converges to −1. This makes stable learning difficult.

Figure 8:
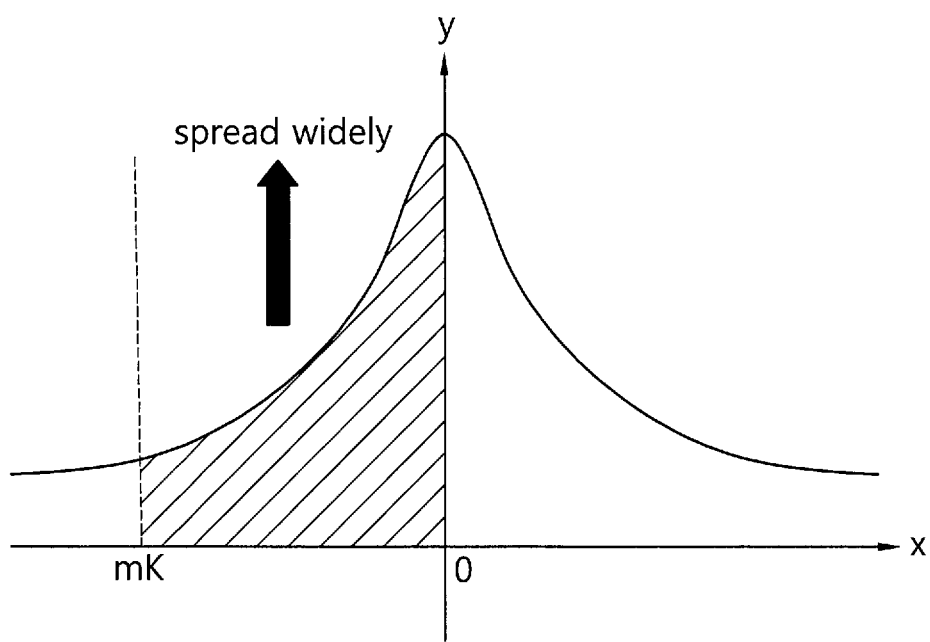
FIG. 8 is a conceptual diagram for explaining that a first derivative output value of the ReELU activation function is stably calculated by applying an initialization method according to an embodiment of the present invention.

FIG. 8 is a conceptual diagram for explaining that the first derivative output value of the ReELU activation function is stably calculated by applying an initialization method according to an embodiment of the present invention.

Referring to FIG. 8, the apparatus uses the ReELU activation function according to the embodiment of the present invention the an activation function, and uses the following weight initialization method to correspond thereto. In one example, the initialization is performed using a normal distribution with X to N (0,1) in which an average is 0 and a standard deviation is $$\sigma = \sqrt{\frac{2}{n_{inputs} + n_{outputs}}} \cdot \sqrt{\frac{1}{P(mK < x)}}.$$

In other words, the Xavier initialization method is basically used, but in the Xavier initialization, the compensation is made by multiplying the standard deviation by the square root of the reciprocal of the probability of the normal probability distribution corresponding to the remaining section except for the section in which the ReELU activation function converges to −1 to widely spread the instability of the negative number region, thereby increasing the stability. The remaining section except for the section in which the ReELU activation function converges to −1 may mean a section of x values having a value greater than a multiplication of m and K.

By using the above initialization method, even if the layer is deep, the value does not converge to −1, and the normal probability distribution is maintained, thereby achieving the stable learning.

Figure 9:
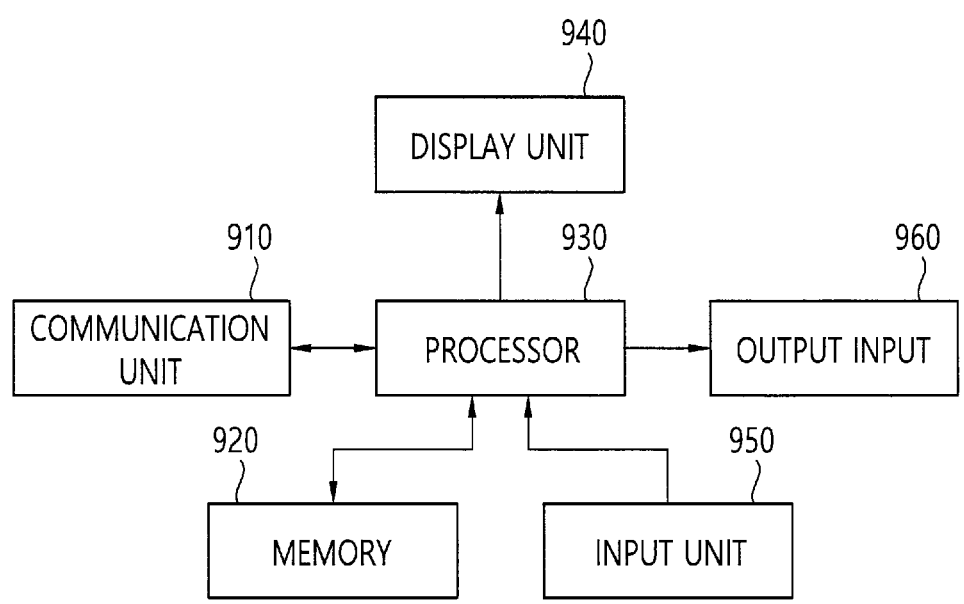
FIG. 9 is a block diagram showing an apparatus for executing a ReELU activation function and an optimal initialization method thereof according to an embodiment of the present invention.

FIG. 9 is a block diagram showing an apparatus for executing a ReELU activation function and an optimal initialization method thereof according to an embodiment of the present invention. As shown in FIG. 9, the apparatus according to an embodiment of the present invention includes a communication unit 910, a memory 920, a processor 930, a display unit 940, an input unit 950, and an output unit 960.

Referring to FIG. 9, the memory 920 is connected to the processor 930 via a signal line. The memory 920 may store a formula for the ReELU activation function according to an embodiment of the present invention, the function which is executed on a mobile problem and the optimal initialization method thereof, and may store a program related to computation of the processor 930 and a mobile program of a mobile device.

The input unit 950 is connected to the processor 930 via a different signal line, and receives a variable (e.g., m or K) related to the activation function and the initialization method. Alternatively, the input unit 950 may receive a value of choice as to whether to use a default value of m or K or whether to use a value of m or K which varies depending on a type of an artificial neural network and/or the number of nodes in the artificial neural network. The input unit 950 may be implemented as a keyboard, a mouse, a touch pad, etc.

The processor 930 is connected to the communication unit 910, the display unit 940, and the output unit 960. The processor 930 may be implemented as a microprocessor or a Central Processing Unit (CPU). The processor 930 obtains the activation function by applying an input value to the formula for the activation function. In addition, the initial weight is set according to the initialization method according to the embodiment of the present invention. Then, the processor 930 calculates an output value corresponding to the input value based on the generated activation function and the initial weight. The processor 930 provides the calculated value to a next node. The processor 930 performs this calculation at each node out of a plurality of nodes so that artificial intelligence learning may be performed smoothly.

In addition, the processor 930 controls fundamental operations for communication and multimedia operation of a portable communication device, such as a smart phone, according to a preset program.

A result of computation related to learning by the processor 930 using an artificial intelligence model may be displayed on the display unit 940 or may be output through the output unit 960.

As such, by reducing an activation function which guarantees stability, a design of the optimal initialization method thereof, and complexity of computation of a method for executing the activation function, an embodiment of the present invention may be implemented as a mobile program.

The apparatus according to the embodiment of the present invention simplifies complex computation so that artificial intelligence learning is enabled even in a mobile program and therefore a variety of artificial intelligence technologies can be implemented by a user anytime and anywhere without constraints.

The above-described system or apparatus may be implemented using hardware components, software components, and/or a combination thereof. For example, the above-described system, apparatus, and components may be implemented using one or more general-purpose computer or a special-purpose computer, such as a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. In addition, the processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable recording mediums.

The method according to embodiments may be implemented as program instructions that can be executed using various computer means and recorded in computer-readable media. The computer-readable media may also include, alone or in combination with the program instructions, data files, data structures, and the like. The program instructions recorded on the media may be those specially designed and constructed for the purposes of example embodiments or may be well-known and available for an ordinary person in computer software industries. Examples of the computer-readable media include magnetic media such as hard disks, floppy disks, and magnetic tapes; optical media such as CD-ROM discs and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The above-described hardware devices may be configured to act as one or more software modules in order to perform the operations of the above-described example embodiments, or vice versa.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

According to the deep learning artificial neural network learning apparatus according to the aspect of the present invention, there is an effect of enabling the stable learning by maintaining a normal probability distribution without converging to a −1 value even when the layer becomes deeper.

What is claimed is:

1. An artificial neural network learning method for deep learning, comprising:
   acquiring an input data or a training data; and
   performing learning through a deep learning artificial neural network model based on the input data and the training data,
   wherein
   the performing of the learning through the deep learning artificial neural network model includes setting an initial weight affecting an activation function between a first node and a second node subsequent to the first node of the artificial neural network model, the first node being included in a first layer and the second node being included in a second layer,
   the setting of the initial weight includes setting the initial weight depending on the number of nodes belonging to the first layer and the number of nodes belonging to the second layer of the artificial neural network model, and
   the initial weight is determined by compensation by multiplying a standard deviation ($\sigma$) by a square root of a reciprocal of a probability of a normal probability distribution for a remaining section except for a section in which an output value of the activation function converges to a specific value.

2. The artificial neural network learning method of claim 1,
   wherein the initial weight is set using a normal probability distribution in which an average is 0 and the standard deviation ($\sigma$) is $$\sigma = \sqrt{\frac{2}{n_{inputs} + n_{outputs}}} \cdot \sqrt{\frac{1}{P(mK < x)}},$$

and
   wherein $n_{inputs}$ denotes the number of nodes belonging to the first layer, $n_{outputs}$ denotes the number of nodes belonging to the second layer, m denotes a length of a specific section in the activation function, K denotes the number of sections having a predetermined length in the activation function, and x denotes an input value from a node of a specific layer which is one of the input layer, the hidden layer, and the output layer.

3. The artificial neural network learning method of claim 2,
   wherein the specific value is −1, and
   wherein a section converging to the specific value is a section having a value smaller than a multiplication of the m value and the K value.

4. The artificial neural network learning method of claim 2,
   wherein the performing the learning through the deep learning artificial neural network model includes
   determining whether an input value to the first node of the artificial neural network is a positive value or a negative value,
   applying a first activation function corresponding to the input value of the positive value,
   applying a second activation function corresponding to the input value of the negative value, and applying the first activation function or the second activation function to provide a generated result value to the second node of the artificial neural network, wherein the first activation function is a rectified linear unit (ReLU) function, wherein the second activation function is a linear function that has a first gradient in a first section of a negative number region and a second gradient in a second section of the negative number region, and wherein the first gradient and the second gradient are different gradients.

5. The artificial neural network learning method of claim 4, wherein the second activation function is expressed by $$M(x) = \begin{cases} \frac{S'(A_n) - S'(A_{n+1})}{m}(x - A_n) + S'(A_n) & \text{if } A_n > x > A_{n+1} (n = -0, 1, \ldots, K) \\ & A_0 = 0 \\ & A_{i+1} = A_i - m(i = 0, 1, \ldots, K-1) \\ & A_{K+1} = -\infty \\ -1 & \text{otherwise} \end{cases}$$

$$S'(x) = \frac{2}{1 + e^{-x}} - 1,$$

and wherein $M(x)$ denotes the second activation function, $A_n$ denotes an x value of an end point of a specific section, n and i denote section indexes, m denotes a length of a section, and K denotes the number of sections having a predetermined length.

6. The artificial neural network learning method of claim 5, wherein the m value denoting the length of the section has a value of 2, and wherein the K value denoting the number of sections has a value of 2.

7. The artificial neural network learning method of claim 5, wherein at least one of the m value and the K value is determined in proportion to the number of nodes of the artificial neural network.

* * * * *